United States Patent [19]

Laakmann

[11] Patent Number: 4,688,892

[45] Date of Patent: Aug. 25, 1987

[54] HOLLOW WAVEGUIDES HAVING DISPARATE DIELECTRIC OVERCOATINGS

[75] Inventor: Katherine D. Laakmann, Laguna Niguel, Calif.

[73] Assignee: Laakmann Electro-Optics, Inc., San Juan Capistrano, Calif.

[21] Appl. No.: 713,151

[22] Filed: Mar. 18, 1985

[51] Int. Cl.$^4$ .............................................. G02B 6/20
[52] U.S. Cl. ............................... 350/96.32; 350/96.34
[58] Field of Search ............... 350/96.10, 96.29, 96.30, 350/96.32, 96.34

[56] References Cited

U.S. PATENT DOCUMENTS 4,068,920 1/1978 Bass et al. ..................... 350/96.32 X

OTHER PUBLICATIONS

Garmire et al., *Applied Optics*, vol. 15, No. 1, Jan. 1976, "Propagation of Infrared Light in Flexible Hollow Waveguides," pp. 145–150.
Miyagi et al., *Applied Optics*, 20(24), Dec. 15, 1981, "Losses and Phase Constant Changes Caused by Bends in the General Class of Hollow Waveguides for the Infrared," pp. 4221–4226.
Miyagi et al., *Transactions of the IEEE*, vol. MTT-32, No. 5, May 1984, "Wave Propagation and Attenuation in the General Class of Circular Hollow Waveguides with Uniform Curvature," pp. 513–521.
Miyagi et al., *Technical Digest of Papers*, CLEO-83, "Optical Waveguides and Fiber Sensors," pp. 210–211.
Yeh et al., *J. Opt. Soc. Am.*, 68(9), Sep. 1978, "Theory of Bragg Fiber," pp. 1196–1201.
Miyagi et al., *Electronics Letters*, 13(10), May 12, 1977, "Transmission Characteristics of a Dielectric-Tube Waveguide with an Outer-Higher-Index Cladding," pp. 274–275.
Miyagi et al., *Journal of Lightwave Technology*, vol. LT-2, No. 2, Apr. 1984, "Design Theory of Dielectric-Coated Circular Metallic Waveguides for Infrared Transmission," pp. 116–126.
Miyagi et al., *IEEE J. of Quantum Electronics*, vol. QE-19, No. 2, Feb. 1983, "Transmission Characteristics of Dielectric-Coated Metallic Waveguide for Infrared Transmission—Slab Waveguide Model," pp. 136–145.
Miyagi et al., *Appl. Phys. Lett.*, 43(5), Sep. 1, 1983, "Fabrication of Germanium-Coated Nickel Hollow Waveguides for Infrared Transmission," pp. 430–432.
Miyagi et al., *J. Opt. Soc. Am.*, 73(4), Apr. 1983, "Waveguide Loss Evaluation by the Ray-Optics Method," pp. 486–489.
Garmire et al., *Appl. Phys. Lett.*, 31(2), Jul. 15, 1977, "Low-Loss Optical Transmission through Bent Hollow Metal Waveguides," pp. 92–94.
Christensen et al., *IEEE J. of Quantum Electronics*, vol. QE-16, No. 9, Sep. 1980, "Transverse Electrodeless RF Discharge Excitation of High-Pressure Laser Gas Mixtures," pp. 949–954.
Lovold et al., *Technical Digest of Papers*, Apr. 15, 1982, "High-Repetition Rate 10-Atm rf-Excited $CO_2$ Waveguide, p. 88.
Whitebrook et al., *Technical Digest of Papers*, Jun. 11, 1981, "High-Power Military $CO_2$ Waveguide," p. 146.
Lachambre, et al., *Appl. Phys. Lett.*, 32(10), May 15, 1978, "A Transversely rf-Excited $CO_2$ Waveguide Laser," pp. 652–653.
H. Hugel et al., *Technical Digest of Papers*, Apr. 15, 1982, "Compact $CO_2$ Laser with Transverse rf-Excitation," pp. 90–91.
T. McMahon et al., *Society of Manufacturing Engineers Technical Paper*, "Waveguides for High Power $CO_2$ Lasers," pp. MR76-869.
Garmire, *Optical Spectra*, Apr. 1979, "Fiber and Integrated Optics: Waveguides in the Infrared," pp. 50–54.

*Primary Examiner*—John Lee
*Assistant Examiner*—Frank González
*Attorney, Agent, or Firm*—Audley A. Ciamporcero, Jr.

[57] ABSTRACT

A hollow waveguide has a rectangular or square internal cross-section, with all internal surfaces coated with a reflecting metal such as silver. One pair of opposing surfaces is dielectric overcoated of a thickness less than half the quarter wave thickness, while the other pair of opposing surfaces is dielectric overcoated with a different material and has a thickness which is an integral multiple of the quarter wave thickness. $ThF_4$, $ZnSe$, and $Ge$ are suitable materials.

7 Claims, 5 Drawing Figures

HOLLOW WAVEGUIDES HAVING DISPARATE DIELECTRIC OVERCOATINGS

TECHNICAL FIELD

This invention relates generally to flexible, narrow diameter, hollow waveguides and, in particular, to those capable of high efficiency transmission of $CO_2$ laser energy suitable for medical applications.

CROSS REFERENCE TO RELATED APPLICATIONS

Reference is made to concurrently filed, commonly assigned patent application both of K. D. Laakman, respectively entitled "Hollow Waveguide Having Plural Layer Dielectric" (U.S. Ser. No. 713,150), and "Hollow Waveguides" (U.S. Ser. No. 713,149).

BACKGROUND OF THE INVENTION

For almost as long as $CO_2$ lasers have been viable tools for medical applications, the search has been on for improved modes of guiding the laser beam to the desired operating area. For the most part, lasers have been coupled with multi-section articulated arms having any number of large bore tubular sections hinged together with a reflective surface at each hinge to permit the laser light to traverse the length of the arm and to be aimed toward the desired site.

While such articulated arm laser systems have experienced wide spread acceptance lately in a variety of medical specialities, they are generally somewhat clumsy to use since the arm typically offers some "resistance" to movement by the surgeon. Such arms are inherently limited in the scope of their medical applications, because of their size and limited flexibility. Present $CO_2$ surgical applications are essentially limited to those in which there is direct access to the area to be treated. $CO_2$ endoscope procedures are still rare, as the present technology requires a relatively wide, but short and straight endoscopic channel to "shoot" the $CO_2$ beam down. In addition, most articulated arms experience problems with beam alignment particularly if the surgical application calls for a small spot size. These arms also tend to be expensive, especially if precision optical alignment is required.

It is an object of the present invention to provide a small diameter, flexible fiber for carrying $CO_2$ laser emissions, which can be threaded down a longer, narrow or flexible endoscope, or alternatively be used as a second puncture probe.

A variety of optical fibers have been proposed as the transmission medium for laser energy, but to date, not a single one has become commercially accepted for the 10.6 micron wavelength which is characteristic of $CO_2$ lasers. Optical fibers or light pipes for the transmission of infrared light at 10.6 microns have however been proposed: in one instance a polycrystalline fiber, such as the KRS-5 fiber developed by Horiba, Ltd. of Japan; and in another, a flexible, hollow waveguide, various versions of which have been suggested by among others E. Garmire and M. Miyagi. See, for instance, M. Miyagi, et al., "Transmission Characteristics of Dielectric-Coated Metallic Waveguide for Infrared Transmission: Slab Waveguide Model", IEEE *Journal of Quantum Electronics*, Volume QE-19, No. 2, February 1983, and references cited therein. Recently, Miyagi, et al. suggested fabricating a dielectric-coated metallic hollow, flexible waveguide for IR transmission using a circular nickel waveguide with an inner germanium layer applied by rf-sputtering, plating and etching techniques. Miyagi, et al. predict extremely small transmission losses for a straight guide, but in fact, actual transmission degrades substantially with but nominal bending radii (20 cm). To understand this, the mechanism of transmission must be considered.

Transmission of laser light through a flexible, narrow diameter hollow waveguide is subject to losses largely due to successive reflections of the beam along the interior surface of the curved guide. For the size and curvatures contemplated for a medical fiber, rays will intersect the wall at angles of incidence ranging from, typically, 80° to 90°. Bending a hollow fiber increases the loss as it tends to increase the number of internal reflections and decrease the angle of incidence. In general, as the angle of incidence decreases from 90° to 80°, the loss per reflection bounce increases. It is an object of the present invention, therefore, to provide a coating which has high reflectivity over angles of incidence ranging from 80° to 90°.

A difficulty of curving metal walls is that at these angles of incidence, metals tend to exhibit high reflectivity for only the S polarization but low reflectivity for the P polarization. The losses for a 1 meter curved guide are of the order 10 dB. Garmire et al. attempted to avoid this problem by using a metal/dielectric guide in which the guide was oriented relative to the incoming beam such that the metal walls "saw" only the P polarization. This approach is flawed, however, because the dielectric walls show high reflectivity for only very, very high angles of incidence, typically in excess of 89°-requiring, in essence, that the guide must be straight along the direction of the dielectric.

Some have suggested remedying this situation by overcoating a reflecting surface with a quarter-wave dielectric coating. Such a coating will yield high reflectivity for the P polarization, but low for the S polarization. Miyagi et al. attempt to strike a compromise by choosing a coating of thickness somewhere between those favoring the P and and those favoring the S polarization. He chose a germanium coating of approxiamately 0.4 to 5 micrometers in thickness. This coating yielded relatively good results (>90%/meter transmission) for straight guides, but rather poor for bent guides.

This disparity appears to result from two factors: (1) The transmission with the $He_{11}$ mode in a straight guide correlates poorly with the transmission of very high multi order modes in a bent guide; and (2) The imaginary part of the refractive index of the dielectric coating is extremely crucial in the transmission of a bent guide.

It is an object of the present invention to provide dielectric overcoated waveguides which are tuned to perform well although bent in compound curvature.

SUMMARY OF THE INVENTION

We have invented a flexible, narrow outer diameter, metal coated dielectric-overcoated hollow waveguide capable of transmitting in excess of 68% of the entering $CO_2$ laser energy over a one meter section even when subjected to compound curvatures. The waveguide is sufficiently thin to be passed down the esophagus of an adult patient and is safe for endoscopic applications.

The invention set forth in the latter above cited application (U.S. Ser. No. 713,149) is premised on dealing with refractivity as a complex (i.e., real plus imaginary) quantity, taking into account both P and S polarizations over a designated range of angles of presentation. In accordance with the principles of that invention, a flexible, narrow diameter, hollow waveguide has an outer reflective structure coated on its inner walls with suitable dielectric material of thickness equal to about one eighth the wavelength of the light to be transmitted by the waveguide.

The principles of the present invention are premised on utilization of a square (or rectangular) cross-section, with each pair of opposing inner walls having a select, different dielectric overcoat, respectively designed separately to optimize P or S polarization. In a preferred embodiment, the inner wall has a reflective (e.g., silver) coating, and two opposing walls have a dielectric overcoat less than half of the quarter wave thickness (and preferably less than 20% of the quarter wave thickness) while the other two opposing walls have a thickness which is an integral multiple (preferably between 1 and 5) of the quarter wave thickness. $ThF_4$, $ZnSe$, and $Ge$, and combinations thereof, are suitable dielectric materials.

As in the above-cited concurrently filed application, the materials of the waveguide walls are chosen for, (1) ability to obtain/retain the requisite inner wall flatness, smoothness, and dimensional control; (2) flexibility; (3) utilization of low loss dielectric overcoatings; and (4) coating adhesiveness. The inner wall is coated with a high reflectivity metal and then overcoated with a dielectric overcoat.

DETAILED DESCRIPTION OF THE PREFERRED EMBODIMENTS INCLUDING THE BEST MODE FOR CARRYING OUT THE INVENTION

In general, for a guide to be useful for medical including endoscopic applications, the average reflectivity of P and S polarizations combined must be greater than 97% and preferably greater than 99% for both P and S polarizations for all angles of incidence from about 80° to about 90°. The reason for requiring a high reflectivity condition over such a broad range of angles is that a curved guide in effect introduces lower angles of incidence as the beam is propagated through the guide. The extreme angle of incidence $\phi$ that needs to be considered in a curved guide of inner cross section d and radius of curvature R is given by the relationship:

$$\phi = \cos^{-1} \sqrt{2d/R}$$

Hence, for a guide with d=1 mm and R=10 cm, the extreme incident angle is 82°. A waveguide in actual medical use will have, of course, a non-uniform radius of curvature introducing in effect even smaller incident angles. However, for a waveguide with an inner cross section diameter on the order of 1 mm the angles of incidence will normally be in the 80° to 90° range.

Figure 1:
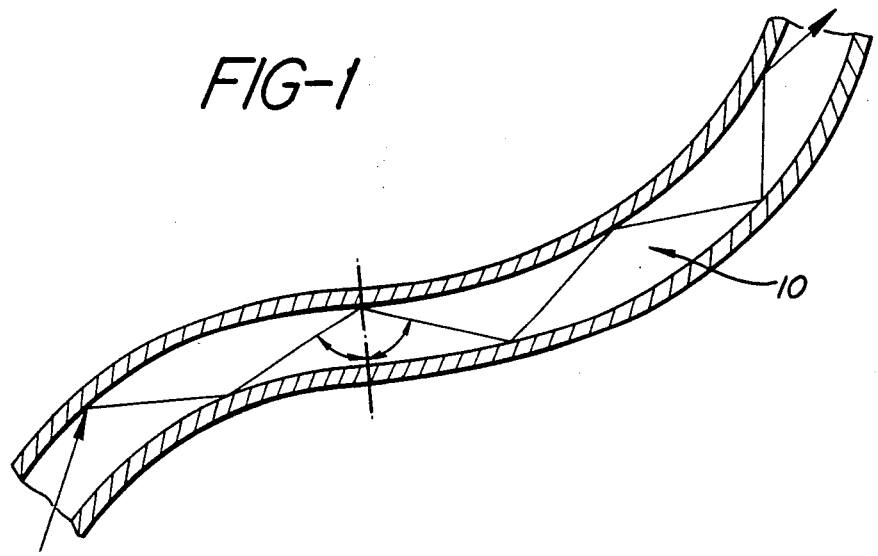
FIG. 1 is a diagrammatic representation of a section of a curved light pipe illustrating schematically the multiple reflections to which a coherent lightwave is subjected while travelling through the light pipe.
Figure 2:
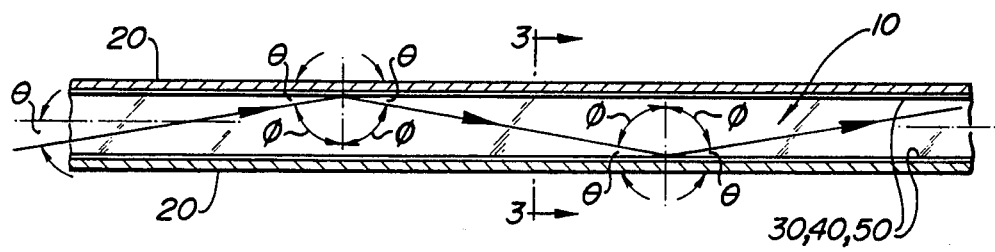
FIG. 2 is a straight section of a portion of a hollow metal waveguide according to the present invention.

In practice, a portion of the waveguide will have compound curvatures such as shown in the diagrammatic illustration of FIG. 1 wherein the laser beam, modeled in FIGS. 1 and 2 as a one dimensional ray, enters the waveguide in a direction normal to a plane orthogonally intersecting the waveguide at one end of the guide. The beam is then reflected off the interior surface of the waveguide at intervals determined by the curvature of the guide. For the types of guides under consideration, i.e., those having an inner diameter of about 1 mm and curvatures of 30 cm or less, a typical ray will hit the interior wall about every 1 to 2 cm. Hence, for a one meter length of the guide there will be about 75 reflections or bounces. Assuming an average energy loss of 0.5% per bounce, a one meter guide will transmit 68% of the light entering the guide. With just a half percent increase in loss per bounce to 1%, the overall transmission falls to about 47%.

For purposes of this application, "transmission rating" shall describe the percentage of $CO_2$ laser energy transmitted by a one meter section of a curved guide. Thus, a 68% transmission rating represents a one meter section of a guide that transmits at least 68% of the energy of a propagating $CO_2$ laser beam entering the guide after the beam is subjected to up to 75 internal reflections.

Figure 3:
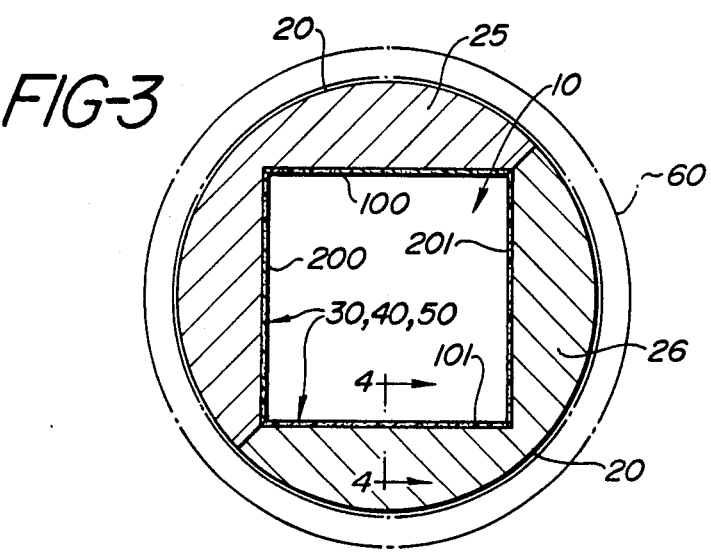
FIG. 3 is a section taken along line 3—3 of FIG. 2.
Figure 4:
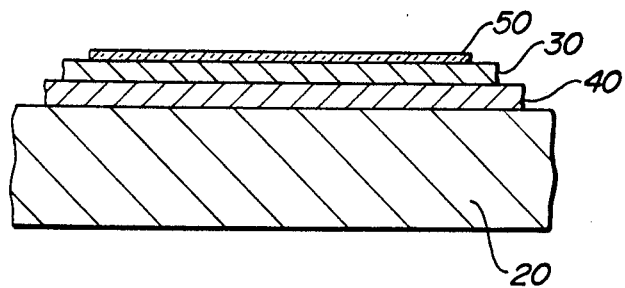
FIG. 4 is an enlarged section taken along line 4—4 of FIG. 3.

With reference to FIGS. 2, 3, and 4 there is shown a straight line section of a flexible hollow waveguide referred to generally as 10. The waveguide includes tube 20 of a material, preferably stainless steel or aluminum, chosen on the basis of mechanical performance including ductility and strength hygroscopicity. Within the tube 20 are matable metal halves 25 and 26, each having a trough, or "V" formed therein, which when mated as shown form the hollow rectangular waveguide therein. The halves 25 and 26 may be milled and coined from wires, or suitable alternation procedures. An additional requirement of the halves 25 and 26 is that they be easily coatable, for example, in a vacuum chamber by an adhesive material, to yield a low loss surface. The inner walls 100, 101, 200, and 201 must also be optically smooth, relative to grazing incidence at 10.6 $\mu$m. Onto these interior surfaces 100, 101, 200 and 201, a metal coating 30 is applied. Coating 30 is a high normal incidence reflector of light at a wavelength of 10.6 microns, such as silver. Other suitable metal coatings include gold and aluminum. The thickness of the silver coating 30 is not critical and is preferably in the range of something less than approximately 100 angstroms. To improve the bonding between silver coating 30 and the halves 25 and 26, a high adhesion coating 40, preferably of chromium, is applied onto the tube prior to the application of the silver coating. With the silver coating 30 so bonded, a thin film dielectric coating 50 is applied.

As above stated in general terms, the present invention features a dielectric overcoat of a thickness of about one-eighth a wavelength, that is, about one half of the quarter wave standard. In greater specifics, the dielectric overcoat of the present invention is to be $0.5 \pm 0.2 \, \lambda_m/4$, where $\lambda_m$ is the wavelength of the light in the medium at the 80° angle of incidence. More precisely, $$\lambda_m = \frac{\lambda}{n} \frac{1}{\sqrt{1 - \frac{\sin^2 80°}{n^2}}}$$

where $\lambda$ is the wavelength of the same light in a vacuum and n is the index of refraction.

The losses obtained for a variety of dielectric coatings are influenced by the thickness of the coating as well as by N, the complex index of refraction of the material. N is given by n+ik, where the extinction coefficient k is the imaginary part, related to the absorption properties of the material. The real part, n, commonly referred to simply as the index of refraction, is the ratio of the speed (or wavelength) of light in a vacuum to the speed (or wavelength) of light in the material. Losses are lower as the imaginary component, k, of the refractive index is minimized. It is crucial to the performance (i.e. transmission) of the waveguide to keep the value of k to some low number. Even though k is related to the properties of the material, to a significant degree the magnitude of k is quality controllable through proper vacuum deposition techniques.

It will be useful to consider individual dielectric coatings, as discussed in Tables 1 through 6 hereafter which are duplicated from the latter above-cited application U.S. Ser. No. 713,149. As the value of k decreases, the greater the tolerance allowed on the coating thickness. For example, with a ThF$_4$ layer with a k=0, thickness in the range from about 0.6$\mu$ to about 2.3$\mu$ (or alternatively 0.2 to 0.8 $\lambda_m/2$) will yield an average reflectivity of P and S combined greater than 99% from 80° to 90°. On the other hand, with k=2×10$^{-3}$, the thickness may only be from about 0.4 to 0.6 $\lambda_m/2$ to still yield the same minimum limit on reflectivity. Tables 1 through 3 illustrate this comparison in detail.

TABLE 1

Loss of Silver coated with ThF$_4$ with loss-less (k = 0) ThF$_4$.

| | T = .58$\mu$ | | T = 1.16$\mu$ | | T − 1.67$\mu$ | | T = 2.23$\mu$ | | T − 2.79$\mu$ | |
|---|---|---|---|---|---|---|---|---|---|---|
| Angle | Loss P | Loss S | Loss P | Loss S | Loss P | Loss S | Loss P | Loss S | Loss P | Loss S |
| 80 | 1.76 | .14 | .77 | .18 | .54 | .32 | .50 | .84 | .50 | 3.18 |
| 83 | 1.57 | .09 | .58 | .13 | .39 | .22 | .35 | .62 | .35 | 4.00 |
| 86 | 1.08 | .05 | .35 | .07 | .23 | .13 | .20 | .37 | .20 | 4.66 |
| 89 | .30 | .01 | .09 | .02 | .06 | .03 | .05 | .09 | .05 | 2.23 |

TABLE 2

Loss of Silver coated with ThF$_4$ of varying thickness, with k = 2 × 10$^{-3}$.

| | T = .6$\mu$ | | T = 1.2$\mu$ | | T − 1.8$\mu$ | | T = 2.4$\mu$ | |
|---|---|---|---|---|---|---|---|---|
| Angle | Loss P | Loss S | Loss P | Loss S | Loss P | Loss S | Loss P | Loss S |
| 81 | 2.79 | .13 | 1.55 | .24 | 1.12 | .72 | 1.01 | 3.86 |
| 83 | 2.64 | .10 | 1.30 | .19 | .91 | .56 | .80 | 3.28 |
| 85 | 2.25 | .07 | .99 | .13 | .67 | .41 | .58 | 2.52 |
| 87 | 1.56 | .04 | .62 | .08 | .41 | .25 | .35 | 1.60 |
| 89 | .56 | .01 | .21 | .03 | .14 | .08 | .12 | .55 |

TABLE 3

Loss of Silver coated with ThF$_4$ of varying thickness, with k = 10$^{-3}$.

| | T = .6$\mu$ | | T = 1.2$\mu$ | | T − 1.8$\mu$ | | T = 2.4$\mu$ | |
|---|---|---|---|---|---|---|---|---|
| Angle | Loss P | Loss S | Loss P | Loss S | Loss P | Loss S | Loss P | Loss S |
| 81 | 2.46 | .13 | 1.26 | .21 | .86 | .53 | .73 | 2.57 |
| 83 | 2.32 | .10 | 1.05 | .16 | .69 | .49 | .58 | 2.18 |
| 85 | 1.98 | .07 | .80 | .12 | .51 | .30 | .42 | 1.68 |
| 87 | 1.37 | .04 | .50 | .07 | .31 | .18 | .26 | 1.06 |
| 89 | .49 | .01 | .17 | .02 | .10 | .06 | .09 | .36 |

Similar dependence of allowable coating thickness on k value can be found with ZnSe as illustrated in Tables 4 and 5.

TABLE 4

Reflection loss of A$_g$ coated with ZnSe of varying thickness in which k = 10$^{-3}$.

| | T = .1$\mu$ | | T = .4$\mu$ | | T − .7$\mu$ | | T = 1.0$\mu$ | |
|---|---|---|---|---|---|---|---|---|
| Angle | Loss P | Loss S | Loss P | Loss S | Loss P | Loss S | Loss P | Loss S |
| 81 | 3.99 | .11 | 1.98 | .16 | 1.16 | .34 | .92 | 2.08 |
| 83 | 4.68 | .09 | 1.76 | .12 | .93 | .26 | .72 | 1.66 |
| 85 | 5.43 | .06 | 1.41 | .09 | .69 | .19 | .52 | 1.21 |
| 87 | 5.62 | .04 | .92 | .05 | .42 | .11 | .31 | .74 |
| 89 | 2.98 | .01 | .32 | .02 | .12 | .06 | .10 | .25 |

TABLE 5

Reflection loss of A$_g$ coated with ZnSe of varying thickness, in which k = 10$^{-3}$.

| | T = .1$\mu$ | | T = .4$\mu$ | | T − .7$\mu$ | | T = 1.0$\mu$ | |
|---|---|---|---|---|---|---|---|---|
| Angle | Loss P | Loss S | Loss P | Loss S | Loss P | Loss S | Loss P | Loss S |
| 81 | 3.97 | .11 | 1.93 | .15 | 1.09 | .32 | .82 | 1.88 |
| 85 | 5.40 | .06 | 1.37 | .09 | .65 | .18 | .46 | 1.06 |
| 89 | 2.97 | .01 | .31 | .02 | .13 | .04 | .09 | .22 |

Even with k=0, for high refractive indices, unacceptably high reflectivity losses occur. Germanium, for example, even with k=0 never yields a low loss reflectivity condition as can be seen in Table 6.

TABLE 6

Reflection loss of A$_g$ coated with Ge and varying thicknesses in which k = 0.0

| | T = .1$\mu$ | | T = .3$\mu$ | | T − .5$\mu$ | | T = .7$\mu$ | |
|---|---|---|---|---|---|---|---|---|
| Angle | Loss P | Loss S | Loss P | Loss S | Loss P | Loss S | Loss P | Loss S |
| 81 | 4.04 | .12 | 2.75 | .20 | 2.31 | .35 | 1.90 | 11.07 |
| 83 | 4.65 | .09 | 2.46 | .16 | 1.63 | .66 | 1.48 | 9.42 |
| 85 | 5.23 | .07 | 1.99 | .11 | 1.19 | .47 | 1.07 | 7.26 |
| 87 | 5.11 | .04 | 1.31 | .07 | .73 | .28 | .64 | 4.63 |
| 89 | 2.52 | .01 | .46 | .02 | .24 | .09 | .21 | 1.60 |

Figure 5:
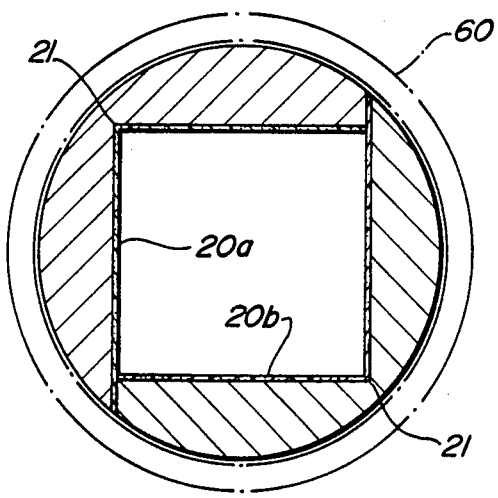
FIG. 5 is a view similar to FIG. 3 representing an alternative embodiment of the waveguide.

As shown in FIGS. 3 and 5, the square cross-section in accordance with the principles of the present invention defines respective opposing pairs of interior walls 100 and 101, and 200 and 201. In accordance with the principles of the present invention, walls 100 and 101 will be provided with a first dielectric layer, having select material composition and thickness, and the other pair such as 200 and 201 will have a second select choice of material and thickness. In this fashion, one pair of walls may be designed to promote optimally one type of polarization, such as P polarization, whereas the other may be configured for optimal transmission of the other polarization, such as S polarization. Clearly, the pair 100 and 101, and/or the pair 200 and 201 may be single layer dielectrics, or as desired may be multiple layer dielectrics as set forth in the former above-cited concurrently filed copending application U.S. Ser. No. 713,150. That application is hereby incorporated by reference herein.

In accordance with the principles of the present invention, the dielectric overcoat on opposing walls 100 and 101 will have a thickness less than one-half the quarter wavelength of the light to be transmitted in the medium, and preferably less than two-tenths such quarter wavelength thickness. If so, the other pair 200 and 201 will be an integer multiple of the quarter wavelength thickness of light in that material, advantageously one plus or minus 0.5 quarter wavelength thicknesses. Ideally, the latter coating will be as close to the quarter wave thickness as possible.

Materials in accordance with the principles of the present invention will preferably be those commonly described in accordance with the concurrently filed copending applications, that is, Ge, ThF$_4$, and/or ZnSe. It will be apparent that the different thicknesses on either walls will require separate prcessing for each, and therefore that the same or different materials may be used, as desired, for the respective opposing pairs of surfaces.

It will be noted that in accordance with the principles of the present invention, a square or nearly square cross-section will be featured, but that rectangular or nearly rectangular designs may also be utilized.

The coating in accordance with the present invention is advantageous over the others, primarily when it is found hard to control the k values of the dielectric to an acceptable small limit. Even with high k values, it is possible to obtain very low loss coatings in accordance with the present invention. On the other hand, this approach has to be balanced by greater difficulty of manufacturing due to the non-homogeneous coating on walls (i.e. different coatings on adjacent walls), and the need to control parallelness and perpendicularitv to about 10 or less. This second requirement is raised because lack of parallelness and perpendicularity causes polarization preservation to be less as an optical beam propogates down a guide. Twists also can lead to this result, but one or two 90° twists over a meter long fiber should have only a negligible effect.

Regardless of choice of dielectric coating materials, the preferred geometry of the metal guide 10 is square shaped as shown in FIG. 3 and in FIG. 5. In FIG. 3, respective halves have V-shaped grooves formed therein, and the square guide results when the opposing portions are joined. The square shape is particularly advantageous for ease of fabrication. In FIG. 5, two essentially V-shaped portions 20a and 20b may be separately coated and subsequently combined to form the guide 20. When V-shaped sections 20a and 20b are placed in a vacuum chamber, resting on their respective pointed ends 21 with their interior surface that is to be coated facing a source of thin film dielectric, a relatively equal thickness coating by the well-known vacuum deposition technique is achievable.

After fabrication, the waveguide 20 is preferably inserted into a plastic or metal sleeve 60 for safety consideration should the guide ever crack during use. To enhance the ease with which metal guide 20 is encased in a plastic sleeve 60, the metal guide 20, as shown in FIG. 5, has a planar interior surface but has a circular exterior.

I claim:

1. A narrow diameter, hollow flexible waveguide for high efficiency transmission of laser light by internal reflection, said waveguide comprising:
   (a) a hollow flexible elongated housing having a generally rectangular internal cross-section;
   (b) a metallic coating having high reflectivity at normal incidence on the internal surface of said guide; and characterized by dielectric coatings consisting essentially of
   (c) a first thin film dielectric overcoat on a first opposing pair of internal surfaces of said waveguide adapted to engage a first polarization of said light; and
   (d) a second thin film dielectric overcoat, different from said first overcoat, on the second pair of internal surfaces of said waveguide, adapted to engage a second polarization of said light.

2. A waveguide as described in claim 1 wherein the composite coatings on said first pair of surfaces yields high reflectivity for one polarization at 80° to 90° incidence, and the composite coatings on said second pair of surfaces yields high reflectivity for the other polarization at 80° to 90° incidence.

3. A waveguide as described in claim 2 wherein said first overcoat has a thickness equal to or less than one-half of the quarter wavelength of light in the material of said first overcoat.

4. A waveguide as descrbed in claim 3 wherein said first overcoat has a thickness equal to or less than one-tenth of the quarter wavelength of light in the material of said first overcoat.

5. A waveguide as described in claim 1 wherein said second overcoat has a thickness approximately equal to the quarter wavelength of light in the material of said second overcoat.

6. A waveguide as described in claim 1 wherein said first and second overcoats are of the same material, but of respectively different thicknesses.

7. A waveguide as described in claim 2 wherein at least one of said pairs of surfaces has a multiple layer dielectric overcoat.

* * * * *